US011959463B2

(12) United States Patent
    Cieslak

(10) Patent No.: US 11,959,463 B2
(45) Date of Patent: Apr. 16, 2024

(54) WIND TURBINE BLADE INSPECTION SYSTEM

(71) Applicant: BLADEBUG LIMITED, London (GB)

(72) Inventor: Christopher Robert Cieslak, London (GB)

(73) Assignee: BLADEBUG LIMITED, London (GB)

( * ) Notice: Subject to any disclaimer, the term of this patent is extended or adjusted under 35 U.S.C. 154(b) by 135 days.

(21) Appl. No.: 16/968,325

(22) PCT Filed: Feb. 11, 2019

(86) PCT No.: PCT/GB2019/050363
    § 371 (c)(1),
    (2) Date: Aug. 7, 2020

(87) PCT Pub. No.: WO2019/155234
    PCT Pub. Date: Aug. 15, 2019

(65) Prior Publication Data
    US 2021/0095642 A1    Apr. 1, 2021

(30) Foreign Application Priority Data
    Feb. 9, 2018 (GB) .................. 1802209

(51) Int. Cl.
    *F03D 80/50* (2016.01)
    *B23P 6/00* (2006.01)
    (Continued)

(52) U.S. Cl.
    CPC .............. *F03D 80/50* (2016.05); *B23P 6/002* (2013.01); *B62D 57/024* (2013.01); *F03D 17/00* (2016.05); *G01M 13/00* (2013.01)

(58) Field of Classification Search
    CPC .......... F03D 80/50; F03D 17/00; B23P 6/002; B62D 57/024
    See application file for complete search history.

(56) References Cited

U.S. PATENT DOCUMENTS 8,019,472 B2 * 9/2011 Montero Sanjuan ....................... B62D 57/024
                                                                                     180/8.5
8,281,442 B2 * 10/2012 Eggleston ............... F03D 80/50
                                                                                     15/21.1
(Continued)

FOREIGN PATENT DOCUMENTS

CN    101999871 A    4/2011
CN    105082143 A    11/2015
(Continued)

OTHER PUBLICATIONS

International Search Report in corresponding PCT Application No. PCT/GB2019/050363, dated May 3, 2019.
(Continued)

Primary Examiner — Jacob J Cigna
(74) Attorney, Agent, or Firm — BACON & THOMAS, PLLC

(57) ABSTRACT

A robotic device includes four or more legs and is configured to crawl over a surface of a wind turbine blade for inspection of and/or maintenance of the wind turbine blade. The robotic device may be programmed to crawl along a leading edge of the wind turbine blade to conduct inspection and/or maintenance of the leading edge of the wind turbine blade. The device may include a body defining a longitudinal axis, a row of legs arranged on opposite sides of the body. The legs may each include two or more articulated limb segments and a foot. The foot may include a suction cup for securing the robotic device to the wind turbine blade.

17 Claims, 8 Drawing Sheets

(51) Int. Cl.
*B62D 57/024* (2006.01)
*F03D 17/00* (2016.01)
*G01M 13/00* (2019.01)

(56) References Cited

U.S. PATENT DOCUMENTS

| | | | |
|---|---|---|---|
| 8,534,395 B2 * | 9/2013 | Niederberger | F24S 40/20 |
| | | | 180/8.5 |
| 8,851,211 B2 * | 10/2014 | Schlee | F03D 80/50 |
| | | | 280/412 |
| 9,193,402 B2 * | 11/2015 | Chin | B63B 59/10 |
| 9,302,787 B2 * | 4/2016 | Hafenrichter | B64F 5/60 |
| 9,481,082 B1 * | 11/2016 | Hafenrichter | G01M 5/0075 |
| 9,643,313 B2 * | 5/2017 | Hafenrichter | F01D 5/005 |
| 10,197,392 B2 * | 2/2019 | Clark | G01M 17/007 |
| 10,232,897 B2 * | 3/2019 | Hafenrichter | B25J 15/0019 |
| 10,634,123 B2 * | 4/2020 | Georgeson | G01C 9/06 |
| 11,053,925 B2 * | 7/2021 | Georgeson | G01N 29/043 |
| 11,118,573 B2 * | 9/2021 | Badger | F03D 1/0675 |
| 2015/0148949 A1 * | 5/2015 | Chin | B05D 1/02 |
| | | | 700/245 |
| 2019/0338759 A1 * | 11/2019 | Badger | B29C 73/04 |
| 2020/0005655 A1 * | 1/2020 | Schickel | G05D 1/106 |
| 2020/0171552 A1 * | 6/2020 | Hamamura | B08B 1/00 |
| 2020/0318619 A1 * | 10/2020 | Laurberg | F03D 1/0675 |

FOREIGN PATENT DOCUMENTS

| | | | | | |
|---|---|---|---|---|---|
| CN | 205129861 | U | | 4/2016 | |
| CN | 106314584 | A | | 1/2017 | |
| CN | 206644885 | U | | 11/2017 | |
| CN | 111505427 | A | * | 8/2020 | |
| CN | 111645087 | A | * | 9/2020 | |
| CN | 112693537 | A | * | 4/2021 | |
| CN | 109333995 | B | * | 7/2021 | B29C 64/112 |
| CN | 113232027 | A | * | 8/2021 | |
| DE | 102010010382 | A1 | | 9/2011 | |
| DE | 102010010382 | A1 | * | 9/2011 | B08B 1/008 |
| EP | 2752621 | A2 | | 7/2014 | |
| ES | 2346617 | B1 | * | 10/2011 | |
| JP | 2017049130 | A | * | 3/2017 | |
| WO | 2005119054 | A1 | | 12/2005 | |
| WO | 2015081013 | A1 | | 6/2015 | |
| WO | WO-2021121522 | A1 | * | 6/2021 | |
| WO | WO-2021213875 | A1 | * | 10/2021 | F03D 80/50 |

OTHER PUBLICATIONS

Written Opinion in corresponding PCT Application No. PCT/GB2019/050363, dated May 3, 2019.
GB Search Report in corresponding GB Application No. 1802209.5, dated Jul. 30, 2018.
GB Search Report and Office Action in corresponding GB Application No. 1901891.0, dated Aug. 7, 2019.
EP Search Report in corresponding EP Application No. 23156191, dated Jun. 12, 2023.

* cited by examiner

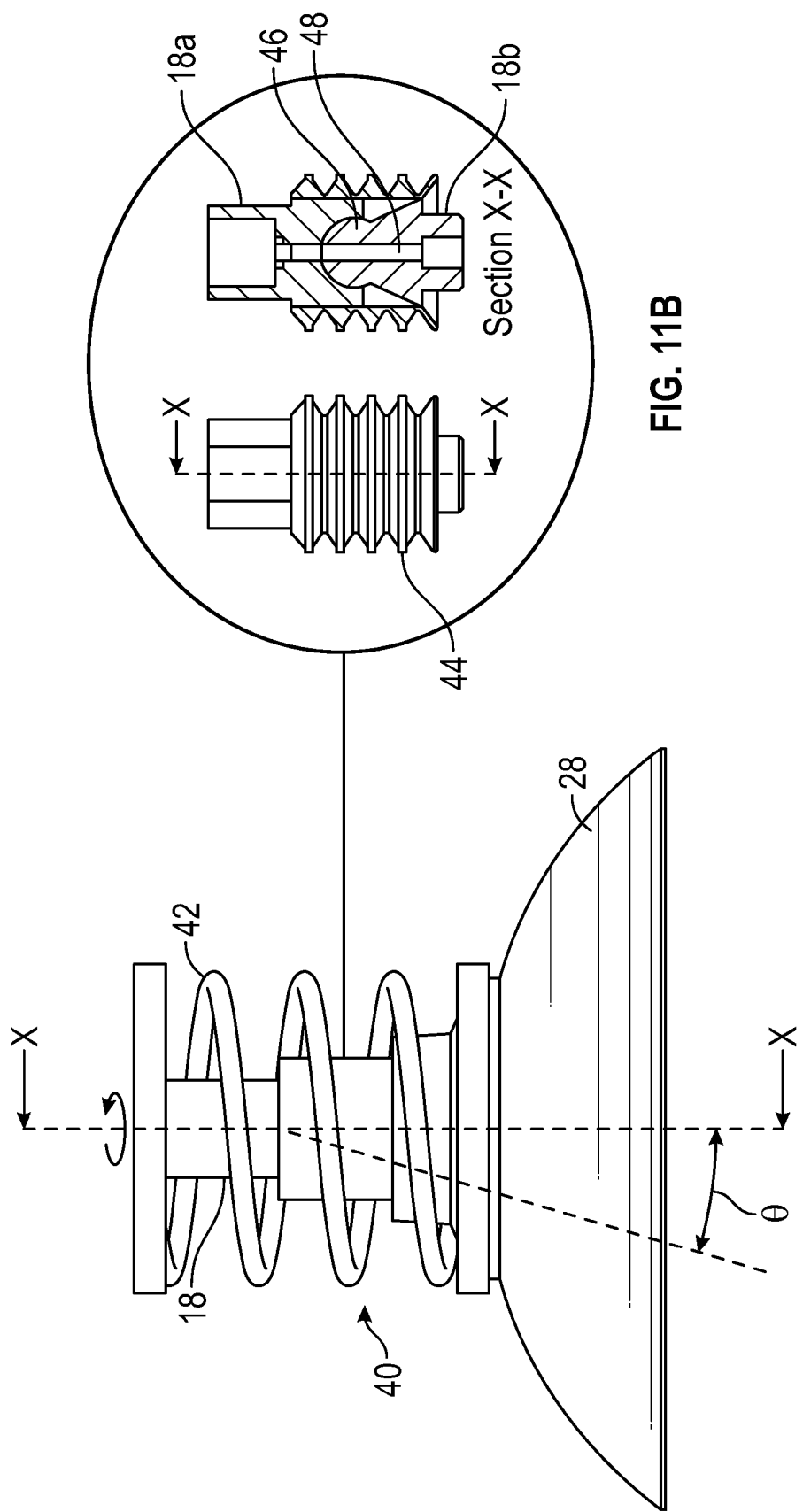

Section X-X

WIND TURBINE BLADE INSPECTION SYSTEM

FIELD OF THE INVENTION

The present specification relates to robotic inspection of wind turbine blades. In particular, it relates to robotic devices comprising a plurality of legs which can walk across a surface of a wind turbine blade.

BACKGROUND OF THE INVENTION

Wind turbines require regular inspection to check for damage, for example, from a bird strike or other object impact, as well as to monitor erosion, for example, leading edge erosion, that can be caused by particulates such as sand or grit, but also by droplets of rain or salt water. Indeed, this is becoming a key issue for the offshore wind sector. As wind turbine blades are generally made of composite materials, if the erosion becomes excessive, then this can open up the core to possible ingress of moisture and subsequent delamination.

In addition, wind turbines are often located in remote places where there can be significant insect populations. As a result there can be build-up of debris, such as from dirt and particulates as well as insects, and this can affect the efficiency of the wind turbine over time. Regular cleaning can be beneficial to reduce this build-up and maintain blade efficiency.

One particular problem which has been identified with modern wind turbine blades is that they can be prone to erosion along their leading edge from particulates such as sand, or even from droplets such as rain or seawater.

Various solutions to wind turbine blade inspection have been proposed. Currently, systems are in place which use drones with cameras or other detectors to identify damage to the blades as well as to the supporting structure, e.g., a mast. There have also been recent attempts to make robots that are able to scale the mast of a wind turbine for the purposes of inspection and maintenance. Some of these use electromagnets to allow the robots to cling to the mast.

There, however, remains a need to provide an improved robotic inspection device for wind turbines, in particular for wind turbine blades.

SUMMARY OF THE INVENTION

Viewed from one aspect, the present invention can be seen to provide a robotic device comprising four or more legs which is configured to crawl over a surface of a wind turbine blade for inspection of and/or maintenance of the wind turbine blade.

This innovative blade crawler, resembling a robotic spider, could significantly reduce current costs and risks of blade maintenance activities. Additionally, it can operate even when the wind is too strong for flying drones.

In particular, the robotic device may be configured to crawl along a leading edge of the wind turbine blade to conduct inspection and/or maintenance of the leading edge of the wind turbine blade. For example, the configuration of the legs (profile and dimensions) should be appropriate for allowing the robotic device to crawl along the leading edge. Moreover, the robotic device may be programmed to recognise automatically the leading edge of the wind turbine blade and then control the movement of its legs autonomously such that it crawls along the leading edge in a tip-wise or root-wise direction to perform the inspection and/or maintenance action.

The robotic device may comprise a body defining a longitudinal axis, the robotic device further comprising a row of legs arranged on opposite sides of the body, the legs each comprising two or more articulated limb segments and a foot. The foot of each leg may also be articulated. In this way, the foot can rest on the surface of the wind turbine blade in a substantially perpendicular manner.

For example, the foot of each leg may include an ankle joint and be articulated to allow at least two and preferably three degrees of movement.

In addition to pivotal movement or alternatively, the ankle joint may allow axial movement of the foot relative to the rest of the leg. This may enable the foot to allow twisting movements of the leg relative to the plane of the blade surface. In this way, the foot can rest on the surface of the wind turbine blade (and fix itself firmly to the surface) in a substantially perpendicular manner and allow rotation to enable the leg and body of the robot to move where necessary whilst the foot remains stationary and fixed to the blade.

Each leg may comprise an upper limb segment (femur) and a lower limb segment (tibia), the upper limb segment being joined to the lower limb segment by a lower articulated joint and the upper limb segment being joined to the body by an upper articulated joint. The upper articulated joint between the body and the upper limb segment may be a hip joint (coxa), offering two degrees of freedom to enable the leg to move forward and aft as well as up and down at this joint.

The lower articulated joint and the upper articulated joint may comprise actuator devices. The actuator devices may be in the form of servo motors. However, they could also be hydraulic actuators and/or pneumatic actuators.

The foot of each leg may comprise a suction device for securing the robotic device to the surface of the wind turbine blade. For example, the foot of each leg may comprise a suction cup. The suction cups may be in the form of concave suction cups, for example, having a radius to height ratio of greater than one. Alternatively, the suction cups may comprise a bellowed structure. Such a structure may be more adaptable to the curvature of the wind turbine blade. The suction cups should be made of a relatively compliant material, for example, a polymer based material.

Each foot may comprise a device to generate suction within the suction cup. For example, this may be a device which comprises a piston to increase the internal volume of the cup and thereby lower the pressure within to create suction against the surface. Alternatively, such a device to generate suction within the suction cup may be mounted on the lower limb segment or other part of the leg. The device may comprise a servo motor, a hydraulic actuator and/or a pneumatic actuator.

In an alternative arrangement, the suction cup may be connected by a tube to a pneumatic or hydraulic supply. A pneumatic or hydraulic device may be placed on the body of the robotic device, or more preferably may be located remote from the robotic device. In this way, the robotic device itself can be made lighter.

The foot of each leg may also be sprung in such a way that the vacuum cup remains essentially perpendicular to the lower limb of the robot when it is not attached to a surface. In other words, when the robotic device is walking, the ankle joint will not move under self-weight or due to acceleration/deceleration forces (or external forces like wind loading) so that the vacuum cup can be positioned squarely on the surface of the blade with each step. The spring force may be provide by a metallic or composite helical spring, belleville washer/conical spring arrangement. The spring force may also be provided by a rubber or elastic polymer compression discs and/or tube arrangement, which is configured to restore the foot to a substantially perpendicular alignment with a lower part of the leg.

In this arrangement where suction cups are provided on each leg, for each leg, a tube may extend from the body to a lower limb segment externally of one or more of the articulated limb segments for providing a pneumatic or hydraulic line to the foot.

The robotic device may comprise a row of two legs arranged on each side of the body. For example, it may take the form of a quadruped. In another embodiment, the robotic device comprises a row of three legs arranged on each side of the body, for example, as a hexaped. In another embodiment, the robotic device comprises a row of four legs arranged on each side of the body, for example as an octoped. The multiped robotic device may, of course, comprise more than eight legs. Thus, the robotic device can be seen to comprise a row of two or more legs arranged on each side of the body.

The robotic device is configured to walk in a crawling manner. The robotic device may be programmed to manoeuvre each leg independently of an adjacent leg so as to lift and reposition a foot on one leg independently of another, adjacent leg. It may be programmed to manoeuvre a leg on one side of the body while maintaining a position of an opposing leg. Alternatively, it may be programmed to manoeuvre a first pair of legs while maintaining a position of an adjacent, second pair of legs.

Each articulated limb segment of the legs may be connected to an adjacent limb segment or the body by individually-actuated, articulated joint. For example, each leg may comprise two articulated joints having an axis arranged in a direction that is substantially parallel to the longitudinal axis of the body (e.g., when the limb is arranged to extend perpendicularly from the body as viewed from above), and a further articulated joint arranged in a direction that is substantially perpendicular to the longitudinal axis of the body.

The robotic device may comprise a camera. This may be arranged on a front region of the body, an underside of the body and/or arranged on a leg. The camera may be an inspection camera, for example, a high-resolution camera with the primary function of obtaining data indicative of the condition of the surface of the wind turbine blade. In addition to or alternatively, the camera may be a navigation camera, to assist the robotic device in its movements across the surface of the wind turbine blade, and in particular along a leading edge of the wind turbine blade. The camera may be a thermographic sensor.

The robotic device may comprise apparatus for repairing damage found on the wind turbine blade. For example, the robotic device may comprise a chamber of resin with a device for applying the resin is a coating to a damaged region of the wind turbine blade. The resin could be a two component present and the robotic device may comprise two chambers, one for containing a first component and the other for containing a second component different to the first, wherein when the components are mixed together during the coating process it allows the mixed resin to harden. The resin might be, for example, an epoxy or polyester based resin.

The robotic device may in addition to or as an alternative comprise apparatus for cleaning the wind turbine blade. The build-up of debris, e.g. insects, particularly along the leading edge, can be a problem in terms of the operating efficiency of the wind turbine blade. The robotic device may be fitted with a chamber cleaning fluid, and may further comprise a brush or scraper for removing debris from the surface of the wind turbine blade.

The robotic device may be free of any ancillary equipment. Alternatively, an umbilical may be used to connect essential items, for example, power, pneumatic, hydraulic, data or other lines, to the robotic device. Thus, a connection for an umbilical may be provided on the body of the robotic device, the connection comprising contacts or ports for supplying the robotic device with power, a pneumatic line, data and/or hydraulic fluid. The pneumatic line, if present, may provide a source of suction for the feet. Such an umbilical may be connected to the body in a position aligned with a longitudinal axis of the body in order to minimise any turning effects on the body through weight or wind loading. Preferably it connects to a lower or underside portion of the robotic device's body. The umbilical may include a flexible portion or pivotal connection to minimise transmission of adverse lateral forces on the robotic device.

Viewed from and another aspect, the present invention provides a robotic device which is configured to crawl over a surface of a wind turbine blade for inspection of and/or maintenance of the wind turbine blade, the robotic device comprising a body defining a longitudinal axis, the robotic device further comprising a row of legs arranged on opposite sides of the body.

The legs of the robotic device may each comprise articulated limb segments and an articulated foot, wherein each foot comprises a suction cup for securing the robotic device to the surface the wind turbine blade. In this way, the robotic device can be made to attach itself securely to a surface of a wind turbine blade.

The suction cup of each foot may be connected to a supply of suction. This could be a vacuum or a low pressure supply arranged to lower the pressure within the suction cup to create the suction against the surface of the wind turbine blade. Alternatively, there might be a supply of high-pressure air which is used to create suction using a device which creates low pressure from high-pressure using Bernoulli's principal.

Viewed from another aspect, the present invention can be seen to provide a system for inspection of and/or maintenance of a wind turbine blade, the system comprising a wind turbine blade; and a robotic device which is configured to crawl over a wind turbine blade. The robotic device may be as described in any of the statements above.

The system may further comprise an umbilical connected at one end to a supply of power, a pneumatic line, a data connection and/or a hydraulic supply, and connected at the other end to the robotic device. Such a pneumatic line may provide a supply of suction or a supply of high-pressure air. The data connection may convey operating instructions to the robotic device as well as conveying inspection data back to a controller for transmission to a remote station where the data can be analysed.

Viewed from yet a further aspect, the present invention can be seen to provide a method of inspecting and/or maintaining a leading edge of a wind turbine blade, the method comprising: operating a robotic device comprising four or more legs straddling over a leading edge of a wind turbine blade so that it crawls along the leading edge to conduct an inspection and/or maintenance action of the leading edge. Such a robotic device may be able to operate in wind strengths that are too high for other devices, like drones, to operate in.

Viewed from yet a further aspect, the present invention can be seen to provide a method of inspecting and/or maintaining a wind turbine blade, the method comprising: securing a robotic device to a surface of a wind turbine blade, the robotic device comprising a body defining a longitudinal axis that is provided with a row of legs arranged on opposite sides of the body, the robotic device being configured to crawl over the surface of the wind turbine blade; manoeuvring the robotic device on the wind turbine blade, the manoeuvring comprising operating one or more of the legs of the robotic device independently of other legs so that the robotic device crawls along and/or over the surface of the wind turbine blade; and performing an inspection action and/or a maintenance action on the wind turbine blade.

The securing the robotic device to the wind turbine blade may comprise generating suction at a point of contact where the robotic device's feet are in contact with the surface of the wind turbine blade. This might apply to two or more feet of the robotic device, preferably all of the feet.

The manoeuvring may comprise operating the legs of the robotic device so that the robotic device crawls along a leading edge of the wind turbine blade. The robotic device may crawl from the root of the wind turbine blade (or close to the root) along the leading edge towards the tip of the wind turbine blade. It may even crawl round the tip of the wind turbine blade, as well as over the remaining surface of the wind turbine blade.

As mentioned above, the robotic device may comprise a suction cup on each foot and the manoeuvring may comprise applying and releasing suction to attach and release the suction cup from the wind turbine blade when lifting and repositioning the corresponding legs. The manoeuvring may comprise allowing a leg which is attached to a surface of a blade to twist about an axis of the leg or axis of a section of the leg with respect to the foot of that leg so as to maintain attachment of the suction cup while permitting a twisting movement of at least a portion of the leg, for example, when another leg of the robotic device is being moved or when equipment such as a grinding device is being lowered onto a surface of the blade.

The method may also include a step of inspecting the condition of the wind turbine blade with a camera carried by a drone prior to securing the robotic device to the wind turbine blade.

A drone could be used to carry the robotic device to the wind turbine, particularly where the wind turbine is an offshore wind turbine. Thus the robotic device can be deployed via drone. Alternatively or in addition, the wind turbine could comprise a location for storing a robotic device as described above, which could then be released onto the wind turbine blade at periodic points to inspect and/or conduct maintenance on the blade.

The performing an inspection action may comprise inspecting a region of the wind turbine blade using a camera or sensor mounted to the underside of the body and/or a leg of the robotic device. The sensor may comprise an ultrasonic emitter and detector, a thermographic sensor, a three-dimensional scanning device, a laser device, or other device for determining the condition of the wind turbine blade.

A controller of the robotic device may be able to control the position of the body relative to the static feet, thus providing a stable platform to enable it to perform its inspection and/or maintenance actions with precision. The controller and actuators may provide the ability to have five axis computer numerical control (CNC) of the body relative to the blade surface. Tools may be attached to the body, such as a surface grinder to allow the accurate removal of damaged material to a predefined shape and profile. Such repairs would facilitate a rope access technician with their work, minimising their exposure time on the surface of the blade. The robotic device could carry out repairs by itself such as reinstating the leading edge profile back to the as designed and manufactured profile after leading edge erosion has taken place.

The robotic device may be launched by a person or a small crane from the nacelle of the turbine by placing it on the root of the blade where it can then be maneuvered to any part of the blade to areas of interest or identified via a drone inspection to be damaged.

The robotic device may be used to crawl inside the blade to carry out inspections and repairs in the small confined spaces within the blade structure. The robotic device may carry out lightning continuity tests to ensure that the lightning protection system is operating correctly.

The robotic device may also spray on surface coatings, such as super hydrophobic coatings to protect the blade surface and minimise dirt or water adhering. Applications of super hydrophobic coatings are potentially a method of reducing ice build-up on the blades of turbines in cold climates.

The robotic device may also inject/spray/apply resins to prevent additional environmental ingress into the blade structure.

BRIEF DESCRIPTION OF THE DRAWINGS

Certain embodiments of the present invention will now be described in greater detail by way of example only and with reference to the accompanying figures in which:

FIG. 11*a* shows an enlarged perspective view of such a spring arrangement for an ankle joint and FIG. 11*b* shows a side view and a cross-sectional view of a further ankle joint.

DETAILED DESCRIPTION OF THE INVENTION

Figure 1:
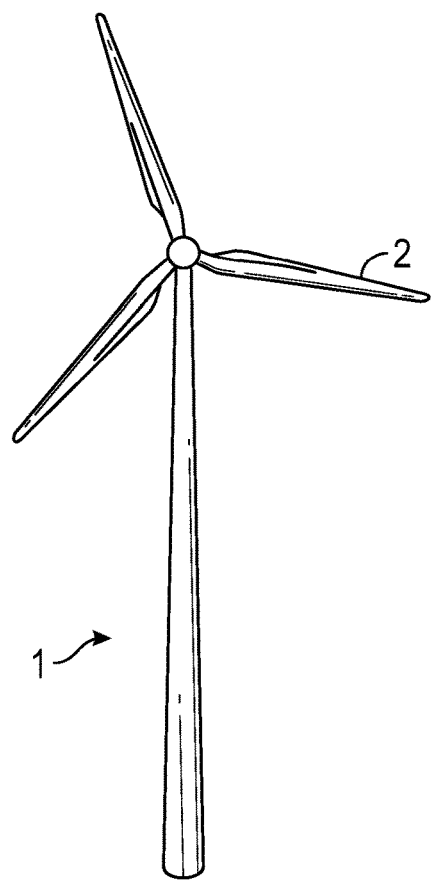
FIG. 1 is a schematic representation of an example of a wind turbine comprising wind turbine blades which are held aloft on a mast.

Wind turbines 1, like the example illustrated in FIG. 1, are becoming a familiar sight on the landscape. They may be land-based wind turbines, or they may be based offshore, for example as part of a floating wind farm for generating electricity. It is predicted that by 2030, floating wind farms will become the norm, with significantly larger turbines generating over 15MW of energy, compared to the 7MW drivetrains today. As larger and larger blades 2 are used in the wind turbines, there is increasing reliance on lighter weight materials. The nature of these materials and the higher relative blade tip speeds, increases their susceptibility of their leading edge to damage.

A key issue for the operations and maintenance in the offshore wind sector is the leading edge erosion of the wind turbine blades. The subsequent loss of energy produced by the wind turbine, and with that the $CO_2$ savings, plus the cost of having unscheduled maintenance downtime should the erosion become more serious, directly affect the cost of the electricity produced, the amount of emissions that could be saved and the security of the supply to the customers.

Offshore turbines operate in harsh and extreme environments such as the North Sea. As wind turbine blades continue getting larger, their tip speeds can exceed 100 m/s. At these speeds, any particulates in the air, such as rain, dust, salt, insects, etc., can wear away the surface of the blade's leading edge, a phenomenon known as leading edge erosion or LEE. This, in turn, alters the aerodynamic shape of the blade, affecting the efficiency and potentially exposing the blade to further and more serious damage, thereby reducing the life of the blade.

Whilst the mechanisms that cause LEE are not yet fully understood, it can be said that at some point, all wind turbine blades will suffer from some form or degree of LEE during their life, which will need to be addressed.

Traditionally, the inspection, servicing and maintenance of wind turbine blades has been reactive. For example, it can take the form of ground based photography with follow-ups using rope access technicians to look at defects identified in the photos. These technicians then carry out necessary remedial works either via rope or, more recently, working platforms installed around the blade. Recently, drones have started to replace ground based photography to capture the initial inspection images and are proving to be a step in the right direction for regular inspection of blades.

Figure 2:
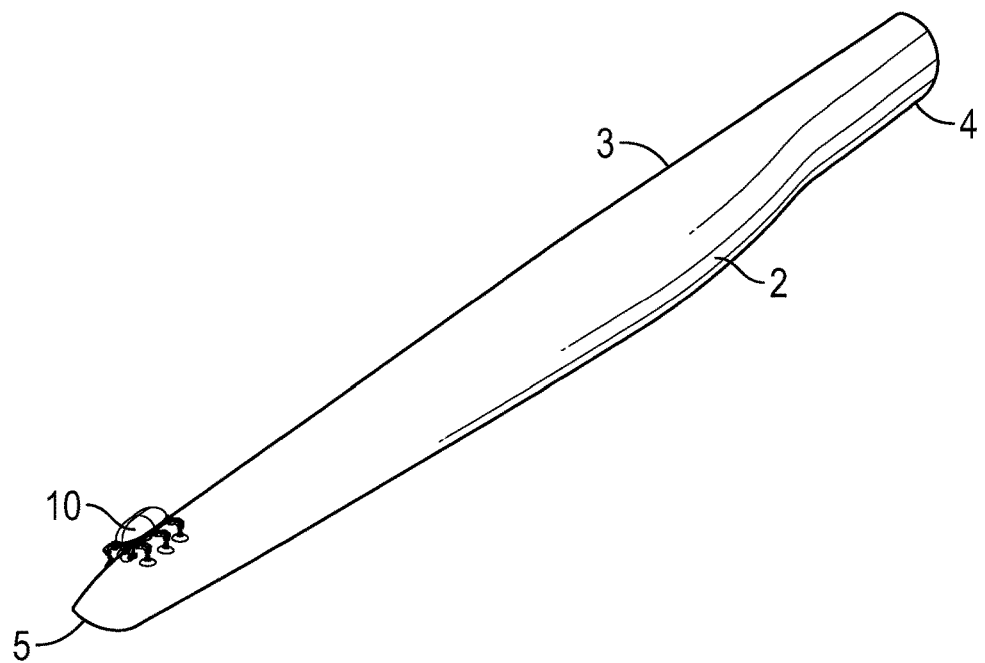
FIG. 2 is an enlargement of one of the wind turbine blades with an exemplary robotic device shown crawling along the wind turbine blade towards the tip of the blade.
Figure 3:
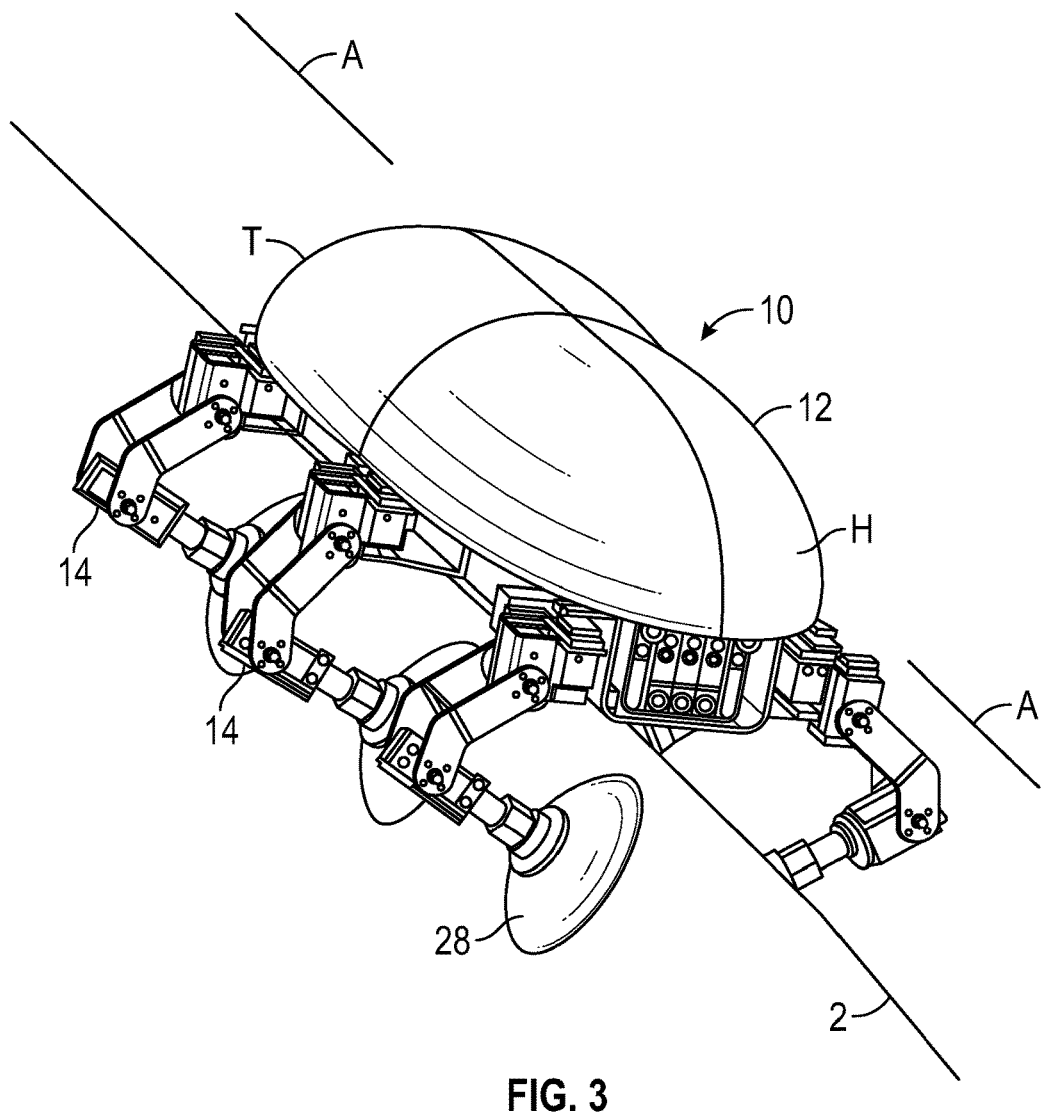
FIG. 3 is an enlargement of the exemplary robotic device of FIG. 2 illustrating how the robotic device is able to walk along a leading edge of the wind turbine blade using a crawling motion.

The proposed robotic device 10 could be used proactively to inspect the wind turbine blades 2 during other service downtime. Such a robotic device 10 is shown crawling along a leading edge 3 of a wind turbine blade 2 in FIG. 2. An enlargement of the robotic device 10 is shown in FIG. 3.

The cost and the dangers to which rope access technicians are exposed in undertaking remedial work remain and increase significantly offshore. It would be desirable to allow these follow-ups to be carried out using advances in robotics to reduce the level of human intervention. In this way, it is possible to then utilise the limited number of skilled technicians more effectively, allowing more blades 2 to be maintained.

The robotic device 10 would allow recording of detailed information about any LEE or other defects detected on the blades 2. The collected data can be transmitted to onshore-based specialist engineers for processing (together with the data from numerous other follow up inspections) and determination of any required remediation work. Early detection and treatment can be cheaper and faster and can minimise additional damage to the blades 2.

As set out above, according to the present invention, there is provided a robotic device 10 which is configured to walk on a surface of a wind turbine blade 2 using a crawling movement. The robotic device 10 may undertake inspection of the wind turbine blade 2 as it crawls over the surface. It may also undertake repairs, clean, or in some other way, assist with the maintenance of the wind turbine blade 2.

The robotic device 10 comprises a body 12 which defines a longitudinal axis A-A. The body 12 may be in the form of a frame, beam, plate or other structure which provides central section to the robotic device 10. The body 12 may be in the form of a trunk or central spine of the robotic device 10, or it could take a form of a disc, ellipse or other shape, for example an organic shape, which extends between the two rows of legs 14. The shape of the body 12 is not important, only its function which is to support a plurality of legs 14 on either side.

The robotic device 10 comprises two rows of legs 14, one arranged on one side of the body, the other in an opposing arrangement on the opposite side of the body, e.g., in a substantially symmetrical form on the opposing sides of the longitudinal axis (A-A in FIG. 3) of the body 12.

The robotic device 10 may comprise just four legs 14 and take the form of a quadruped. Similarly, the robotic device 10 may comprise more than four legs 14. In one example, the robotic device 10 comprises six legs 14, with a row of three legs 14 arranged on each side of the body 12, to provide a hexaped robot. In another example, the robotic device 10 comprises eight legs 14, with a row of four legs 14 arranged on each side of the body 12 to provide an octoped robot. The robotic device 10 may comprise ten, twelve, fourteen, etc., or more legs 14, as desired by the service conditions. The robotic device 10 could conceivably have different numbers of legs 14 on each side of the body 12 too, i.e., an odd number of legs 14, if that was felt desirable.

Each leg 14 of the robotic device 10 may take a similar form. Alternatively, pairs of legs 14 may have a different configuration from other pairs further down the body 12 from a head end H to a tail end T. For example, the legs 14 may be a different size or they may have a different structure according to their intended purpose at a given position.

Overall, the robotic device 10 may have a bug-like, spider-like or caterpillar-like appearance through the provision of the rows of legs 14 along a central body 12.

The robotic device 10 is able to crawl over the surface of the wind turbine blade 2 by lifting and repositioning its legs 14 in sequence slightly further along a path. It may move only one leg 14 at a time, though more usually it will move several legs 14 at once while keeping the remaining legs 14 stationary. This might take the form of alternate opposing legs 14 moving while the other alternate opposing remain still. Alternatively, the robotic device 10 may move a pair or pairs of legs 14 at a time, while keeping other legs 14 stationary. The desired crawling style may depend on the number of legs 14 as well as desired speed of walk.

During the crawling movement, the stationary legs 14 may be fixed to the surface of the blade 2, for example, by using suction in a suction cup 28 fitted to a foot 40 of each leg. Some twisting of the stationary legs may be permitted during the crawling to facilitate movement of the other legs.

Figure 4:
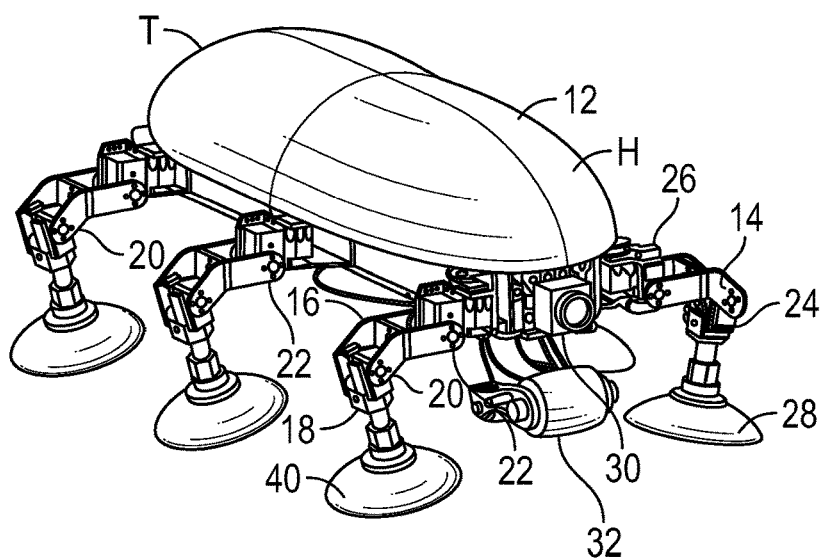
FIG. 4 is a perspective view of an exemplary robotic device which is provided with a grinding device.

As can be seen in FIG. 4, the legs may each comprise two limb segments 16, 18, for example, an upper limb segment 16 and a lower limb segment 18 as the limb segments 16, 18 are seen when the robotic device 10 is standing on a horizontal surface. The upper limb segment 16 is joined to the lower limb segment 18 by a lower articulated joint 20, while the upper limb segment 16 may be joined to the body 12 by an upper articulated joint 22.

The lower and upper articulated joints 20, 22 may comprise actuator devices 24, 26, which are able to control the angular position of one limb segment to each other. Such actuator devices 24, 26 may comprise many forms. In one example the actuator devices 24, 26 are provided by servo motors. In another example the actuator devices 24, 26 are in the form of hydraulic actuators or pneumatic actuators.

The articulated limb segments 16, 18 are sized and configured to enable the robotic device 10 to straddle over a leading edge 3 of a wind turbine blade 2. In this way, the feet 40 of opposing legs 14 are positioned on opposite sides of the leading edge 3. For example, the limb segments 16, 18 may be between 3 and 25 cm in length.

In the straddling position, the lower limb segments 18 of the legs 14 may be inclined to one another at an enclosed angle of between 90° and 180° when the robotic device 10 straddles over the leading edge 3. Clearly the position of the legs 14 will be dependent on the thickness of the wind turbine blade 2 and the relative size of the robotic device 10. Thus depending on the profile of the blade 2 a typical enclosed angle might be between 110 and 160°, 120 and 150°, and may be for example around 130 to 140°.

In this straddling position, the upper limb segments 16 in one row of legs 14 may be inclined at an angle of between 30° to 110°, between 40° to 90°, and maybe for example around 50° to 70°.

The legs 14 of the robotic device 10 support the body 12 in a position substantially over the leading edge 3 of the wind turbine blade 2. In this way, the robotic device 10 can crawl along the leading edge 3 of the wind turbine blade 2 in order to inspect or conduct some maintenance operation.

The robotic device 10 may comprise suction cups 28 as feet 40 to enable it to secure itself to the wind turbine blade 2 as it walks along the surface. The material of the wind turbine blade 2 is usually a composite material, for example, a carbon fibre composite, and as such may be non-magnetic. The surface of the wind turbine blade 2 may be roughened where there is a build-up of debris that needs cleaning off or where there is damage to the wind turbine blade through impact with objects or through erosion.

The robotic device 10 may comprise equipment to inspect and repair damage on the turbine blade 2. For example, the robotic device 10 may comprise a camera 30 navigating along the wind turbine blade 2. The camera 30 may also be used to inspect the surface of the wind turbine blade 2 or an additional camera might be provided for that purpose. The robotic device 10 may further comprise a grinding device 32, for grinding the surface of the wind turbine blade 2 prior to applying a repair, for example, a coating of resinous material such as an epoxy or polyester resin.

Figure 5:
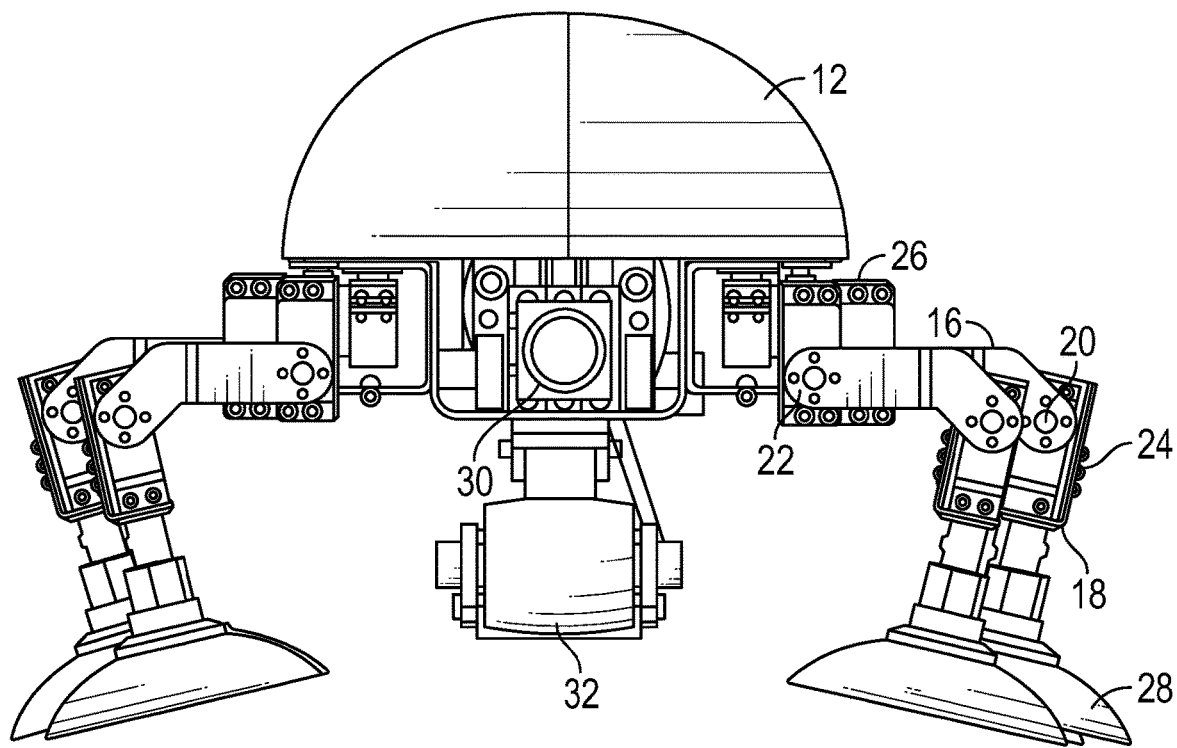
FIG. 5 is a front elevation of the robotic device in FIG. 4.
Figure 6:
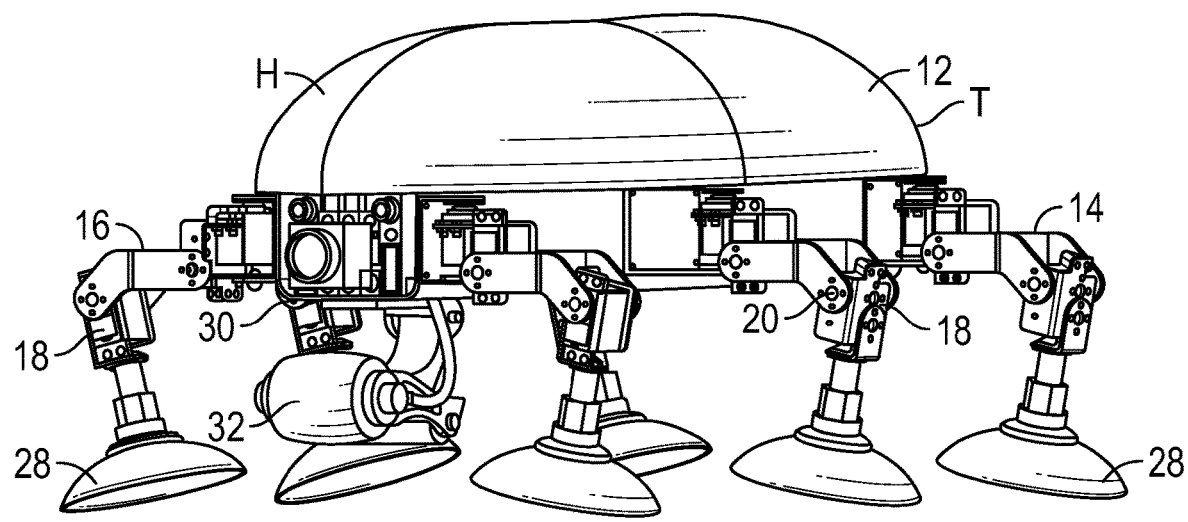
FIG. 6 is a side perspective view of the robotic device in FIGS. 4 and 5.

FIGS. 5 and 6 show an exemplary robotic device 10 from the front as well as from one side.

Figure 7A:
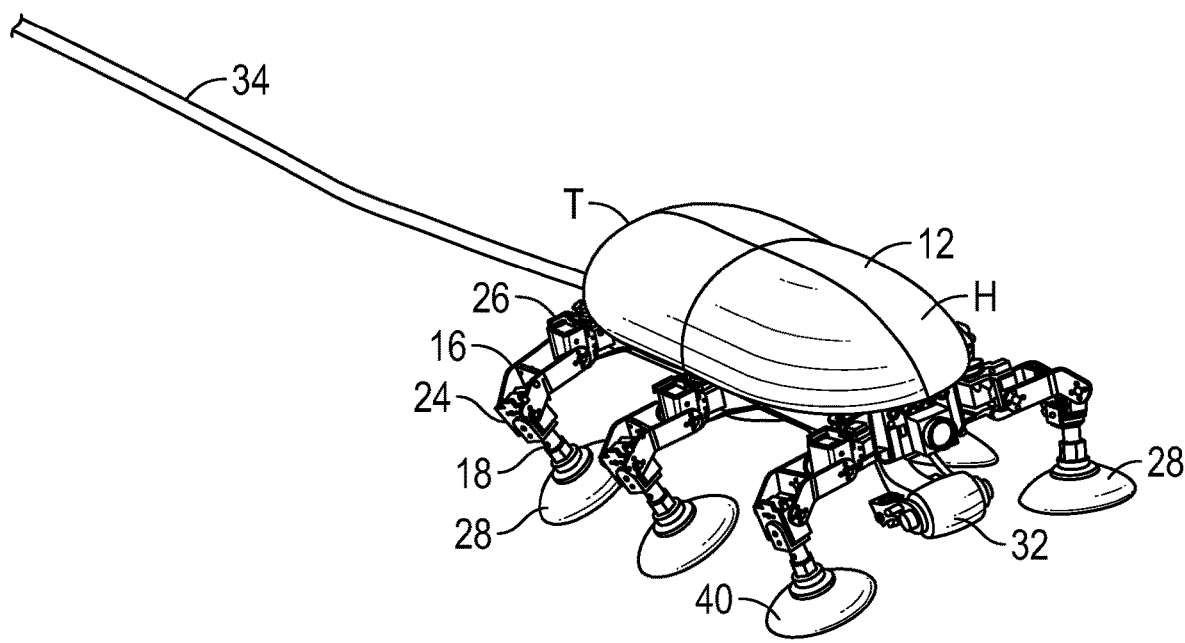
FIGS. 7*a* and 7*b* show a perspective views of an exemplary robotic device comprising a grinding device and an umbilical from above and below.
Figure 7B:
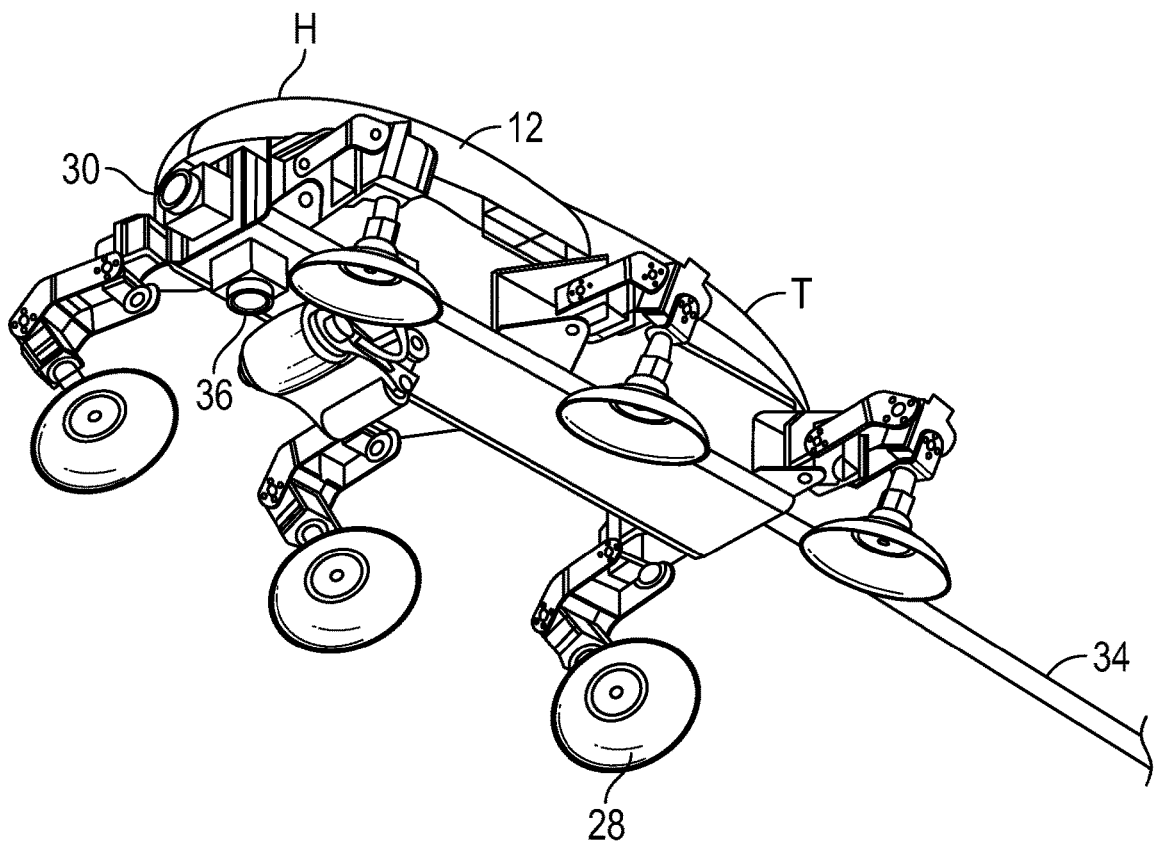

FIGS. 7a and 7b show an exemplary robotic device 10 comprising an umbilical 34. The umbilical 34 may be used to convey power, a pneumatic supply, a hydraulic supply and/or data to the robotic device 10. The other end of the umbilical 34 may attach to ancillary equipment located at the top of the wind turbine mast.

As shown in FIG. 7b, the robotic device 10 may comprise additional cameras or sensors 36 on its underside.

Figure 8:
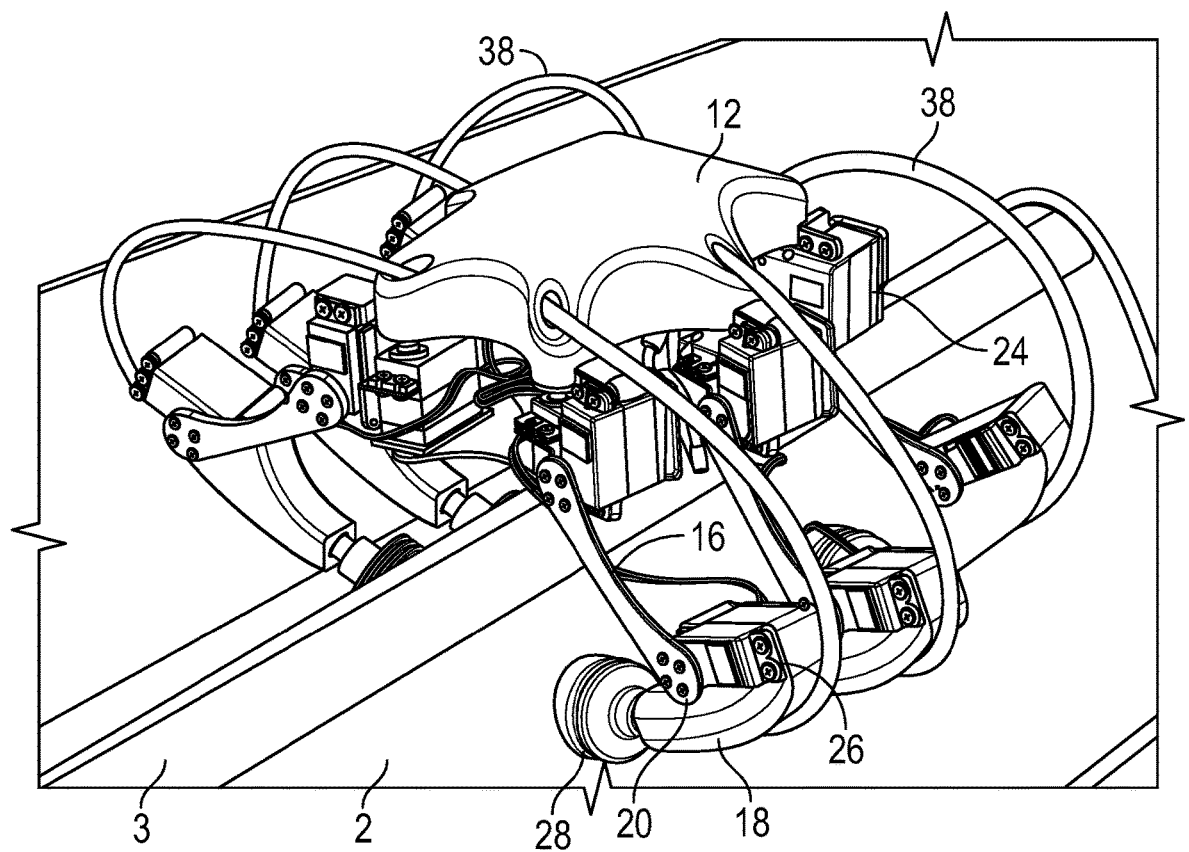
FIG. 8 illustrates a perspective view of another exemplary robotic device.
Figure 9:
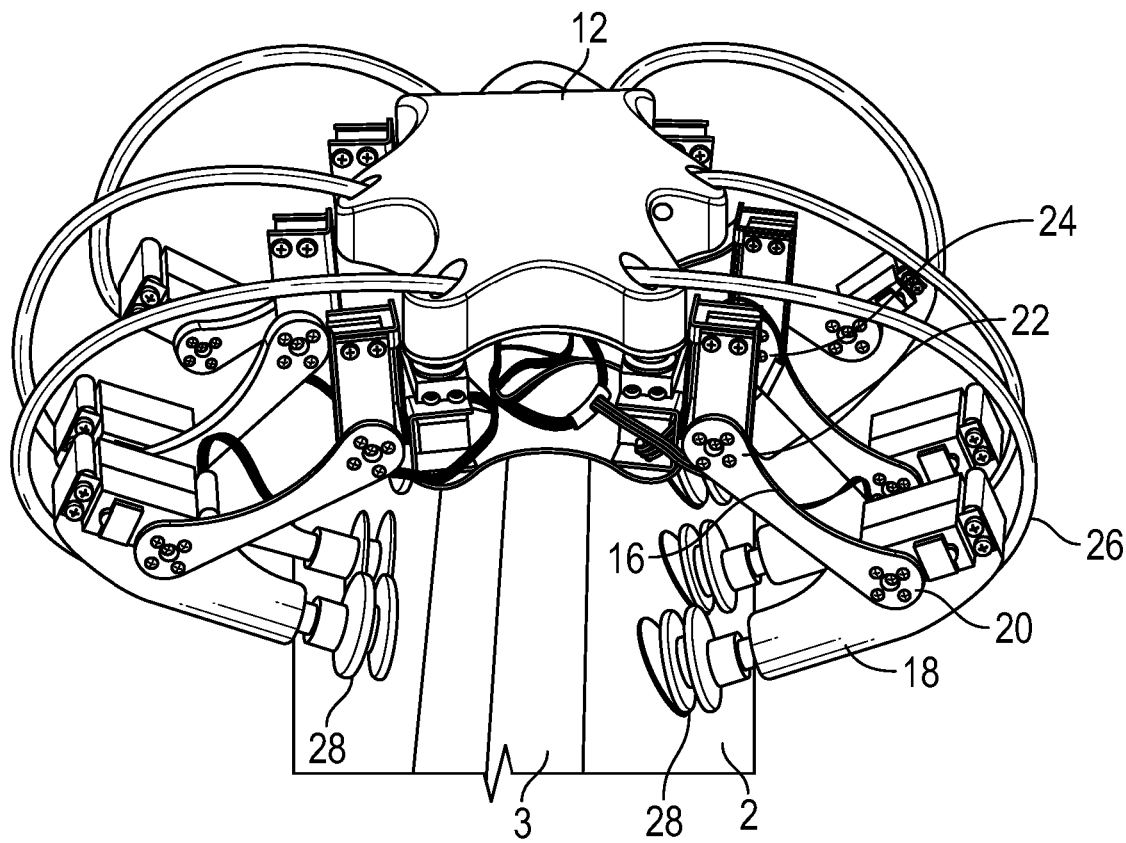
FIG. 9 illustrates a front view of the exemplary robotic device of FIG. 8.

FIGS. 8 and 9 illustrate perspective views of a further robotic device 10 which comprises suction cups 28 in the form of bellow structures or boots. Tubes 38 are used to supply hydraulic and/or pneumatic lines to the suction feet 28.

Figure 10:
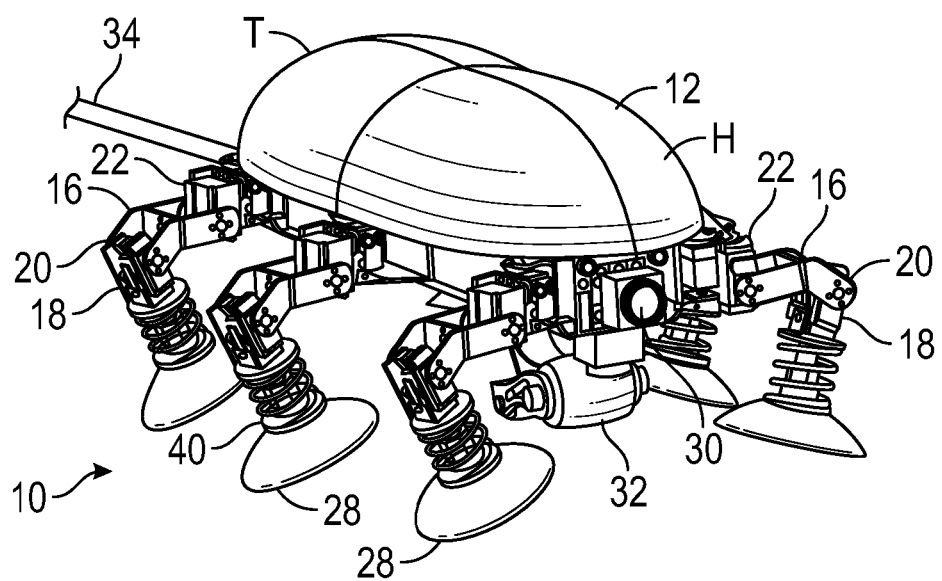
FIG. 10 illustrates a perspective view of another exemplary robotic device comprising ankle joints with spring arrangements to bias the suction cup into a position where it is substantially perpendicular to a lower portion of the leg.

FIG. 10 illustrates a perspective view of another robotic device 10 which includes feet comprising suction cups 28. These are provided as dish-shaped suction cups 28, though other forms of suction cup 28 would also be possible.

As shown, each leg 14 comprises an upper limb segment (femur) 16 and a lower limb segment (tibia) 18, the upper limb segment 16 being joined to the lower limb segment 18 by a lower articulated (knee) joint 20 and the upper limb segment 16 being joined to the body 12 by an upper articulated joint 22. The upper articulated joint 22 between the body 12 and the upper limb segment 16 is a hip joint (coxa), offering two degrees of freedom to enable the leg 14 to move forward and aft as well as up and down at this joint.

In addition, each leg 14 is provided with a foot 40 that is connected to the lower limb segment 18 by an articulated joint. This may be in the form of ball joint or via a flexible connection as will be described further below.

FIGS. 11a and 11b show an enlargement of the foot detail of FIG. 10. In FIG. 11a, the foot 40 comprises a suction cup 28 which is mounted to a lower section of the lower limb 18. A helical spring 42 or other spring arrangement, for example a plurality of stacked Belleville washers 44 (see the conical washers in the left-hand portion of FIG. 11b) may be provided to create a resilient arrangement which provides a restoring force to return the suction cup 28 to a position where it is arranged substantially at right angles to the axis X-X of the lower limb 18.

The resilient arrangement may help to avoid unwanted movement of the foot 40 with respect to the lower limb segment 18 through the effects of gravity, acceleration/deceleration forces during movement or through external forces such as wind loading on the suction cup 28 as it is being moved across the blade 2. In this way, the robotic device 10 may be able to crawl more easily across the surface of the blade 2 and gain a secure footing more quickly in adverse conditions.

As can be seen in the right hand portion of FIG. 11b, the lower limb 18 may comprise two axial sections 18a, 18b which are joined together by a ball and socket joint to allow articulation of the foot 40 with respect to the lower limb 18. In this way, the foot 40 is provided with an articulated ankle joint 46.

The ankle joint 46 can allow a range of tilting movement of the suction cup 28 with respect to an axis X-X of the lower limb segment 18, as indicated by the angle Θ. However any tilting or deflection of the suction cup 28 with respect to the axis X-X is resisted by the bias of a restoring force from the resilient arrangement, maintaining a substantially perpendicular configuration for the foot with respect to the axis X-X of the lower limb segment when it is lifted off the surface of the blade 2.

In addition, the ankle joint 46 can allow the suction cup 28 to twist about the axis X-X with respect to the lower limb section 18 as indicated by the arrow. This allows the foot 40 to remain firmly attached to the surface of the blade 2 whilst allowing some twisting movement in the leg 14 of the robotic device 10, for example, whilst the robotic device 10 is moving another leg 14.

Also evident in the cross-sectional view of FIG. 11b is that a passageway 48 can be provided extending axially through the two sections 18a, 18b of the lower limb segment 18 as well as the ball and socket joint of the ankle joint 46 for coupling a source of suction (not shown, but could be via the umbilical 34) with the suction cup 28.

Figure 12A:
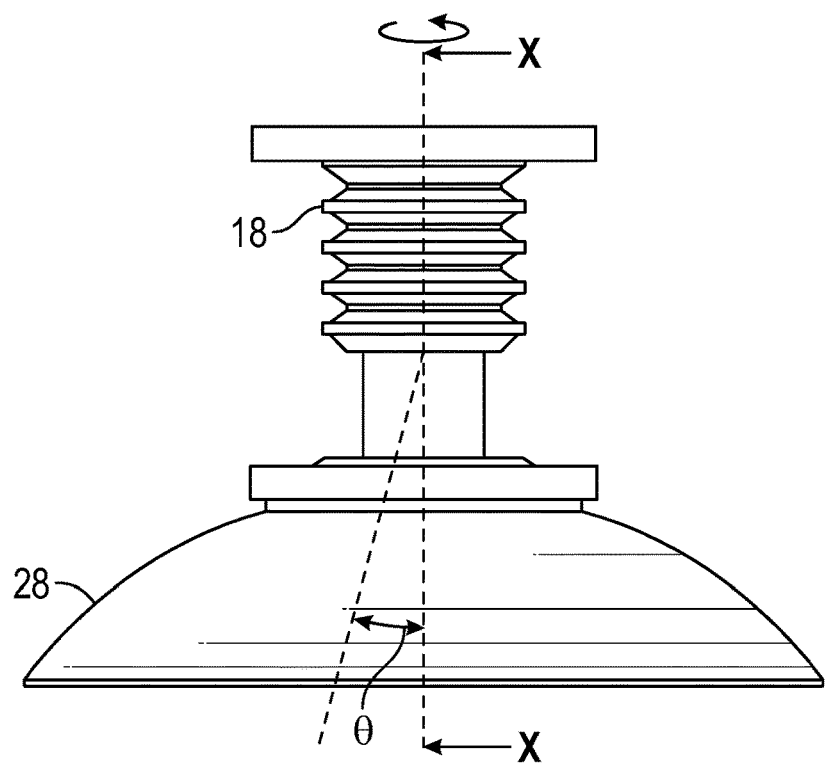
FIGS. 12a and 12b shows a side view and a sectional view of a resilient lower limb segment comprising a resilient tubular section which is able to provide a similar restoring force on the suction cup.
Figure 12B:
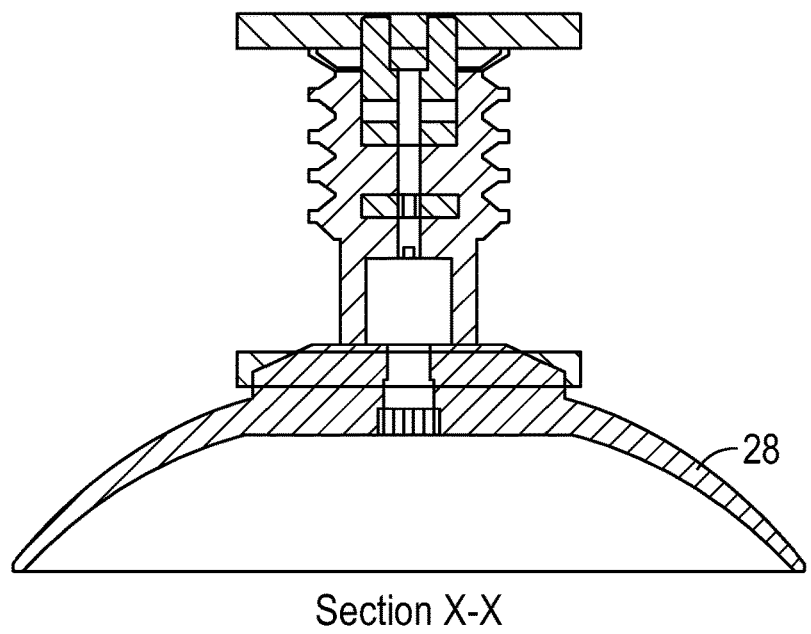

FIGS. 12a and 12b show an alternative foot and ankle arrangement where the lower limb segment 18 comprises a resilient section, for example, comprising a rubber or a elastomeric polymer tubular member, which may include formations to promote articulation against a bias. Thus the lower limb segment may comprise a flexible portion in the lower limb segment 18 which can accommodate a limited amount of tilting. The connection of this part to the suction cup 28 or to the articulated knee joint 20 may arranged to allow twisting of the suction cup 28 about the axis X-X of the lower limb segment 18 as indicated by the arrow. Again a passageway 48 can be included within the lower limb segment 18 to couple a source of suction with the suction cup 28.

The robotic device of FIG. 10 may further include a grinding device 32, a camera 30 and an umbilical as described in the earlier embodiments.

The invention claimed is:

1. A robotic device comprising four or more legs which is configured to crawl over a surface of a wind turbine blade for inspection of and maintenance of the wind turbine blade, wherein the robotic device is programmed to recognize automatically a leading edge of the wind turbine blade and then control a movement of the four or more legs autonomously such that the robot device crawls along the leading edge of the wind turbine blade to conduct inspection and maintenance of the leading edge of the wind turbine blade,
   wherein the robotic device comprises a body defining a longitudinal axis, the four or more legs comprising a row of legs arranged on opposite sides of the body, the legs each comprising two or more articulated limb segments and a foot, and the articulated limb segments comprising an upper limb segment and a lower limb segment,
   wherein the upper limb segment is joined to the body by a first articulated joint, the lower limb segment is joined to the upper limb segment by a second articulated joint, and the foot is joined to the lower limb segment by a third articulated joint,
   wherein the limb segments are articulated in a way that enables the robotic device to straddle over a leading edge of the wind turbine blade with the feet of opposing legs positioned on opposite sides of the leading edge, and
   wherein the robotic device comprises a chamber of resin with a device for applying the resin as a coating to a damaged region of the wind turbine.

2. The robotic device as claimed in claim 1, wherein each foot is connected to a leg of the robotic device by an ankle joint which allows the foot to twist about an axis of the leg, and/or allows the foot to tilt with respect to the leg, against a restoring bias.

3. The robotic device as claimed in claim 1, wherein the lower articulated joint and the upper articulated joint comprise actuator devices.

4. The robotic device as claimed in claim 1, wherein the robotic device comprises a row of three or more legs arranged on each side of the body.

5. The robotic device as claimed in claim 1, wherein each leg comprises two articulated joints having an axis arranged in a direction that is substantially parallel to the longitudinal axis of the body, and a further articulated joint arranged in a direction that is substantially perpendicular to the longitudinal axis of the body.

6. The robotic device as claimed in claim 1, wherein the robotic device comprises a camera, a sensor, a grinding device and/or apparatus for cleaning the wind turbine blade.

7. A system for inspection of and maintenance of a wind turbine blade, the system comprising:
   a wind turbine blade; and
   a robotic device as claimed in claim 1, wherein the robotic device is configured to crawl over a wind turbine blade, the system comprising an umbilical connected at one end to a supply of power, a pneumatic line, data connection and/or water supply, and connected at the other end to the robotic device.

8. The robotic device as claimed in claim 1, wherein the robotic device is configured to crawl inside the wind turbine blade to carry out inspections and repairs in confined spaces within the wind turbine blade.

9. The robotic device as claimed in claim 1, wherein the foot of each leg comprises a suction cup, in the form of a concave cup or comprising a bellowed structure.

10. The robotic device as claimed in claim 9, wherein the suction cup is connected to a pneumatic supply by a tube leading to the body.

11. A method of inspecting and maintaining a wind turbine blade, the method comprising:
   securing a robotic device to a surface of a wind turbine blade, the robotic device comprising a body defining a longitudinal axis that is provided with a row of legs arranged on opposite sides of the body, the legs each comprising two or more articulated limb segments and a foot, the articulated limb segments comprising an upper limb segment and a lower limb segment, wherein the upper limb segment is joined to the body by a first articulated joint, the lower limb segment is joined to the upper limb segment by a second articulated joint, and the foot is joined to the lower limb segment by a third articulated joint, and the robotic device being configured to crawl over the surface of the wind turbine blade, wherein the limb segments are articulated in a way that enables the robotic device to straddle over a leading edge of the wind turbine blade with the feet of opposing legs positioned on opposite sides of the leading edge, and wherein the robotic device comprises a chamber of resin with a device for applying the resin as a coating to a damaged region of the wind turbine blade, wherein the robotic device is programmed to recognize automatically a leading edge of the wind turbine blade and then control a movement of the four or more legs autonomously such that the robot device crawls along the leading edge of the wind turbine blade to conduct inspection and maintenance of the leading edge of the wind turbine blade;
   manoeuvring the robotic device on the wind turbine blade, the manoeuvring comprising operating one or more of the legs of the robotic device independently of other legs so that the robotic device crawls along and/or over the surface of the wind turbine blade; and
   performing an inspection action and a maintenance action on the wind turbine blade.

12. The method as claimed in claim 11, wherein securing the robotic device to the wind turbine blade comprises generating suction at a point of contact where the robotic device's feet are in contact with the surface of the wind turbine blade.

13. The method as claimed in claim 11, wherein the manoeuvring comprises operating the legs of the robotic device so that the robotic device crawls along a leading edge of the wind turbine blade.

14. The method as claimed in claim 11, wherein the method includes a step of inspecting a condition of the wind turbine blade with a drone prior to securing the robotic device.

15. The method as claimed in claim 11, wherein performing the inspection action comprises inspecting a region of the wind turbine blade using a camera and/or sensor mounted to an underside of the body and/or a leg of the robotic device.

16. The method as claimed in claim 11, wherein performing the maintenance action comprises grinding a region of the wind turbine blade using a grinding device.

17. The method as claimed in claim 11, comprising carrying out lightning continuity tests to ensure that a lightning protection system of the wind turbine blade is operating correctly.

* * * * *